US008606609B2

(12) United States Patent
Bentsen et al.

(10) Patent No.: US 8,606,609 B2
(45) Date of Patent: *Dec. 10, 2013

(54) METHOD AND SYSTEM FOR VISUALLY INDICATING PROJECT TASK DURATIONS ARE ESTIMATED USING A SINGLE CHARACTER

(75) Inventors: Brett A. Bentsen, Redmond, WA (US); Qin Zhang, Alameda, CA (US); Eric W. Doerr, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1526 days.

This patent is subject to a terminal disclaimer.

(21) Appl. No.: 11/764,279

(22) Filed: Jun. 18, 2007

(65) Prior Publication Data
US 2007/0299707 A1 Dec. 27, 2007

Related U.S. Application Data

(63) Continuation of application No. 09/704,638, filed on Nov. 1, 2000, now Pat. No. 7,249,042.

(51) Int. Cl.
*G06Q 10/00* (2012.01)
(52) U.S. Cl.
USPC .......................................... 705/7.12
(58) Field of Classification Search
USPC .......................................... 705/7.12
See application file for complete search history.

(56) References Cited

U.S. PATENT DOCUMENTS

| | | | |
|---|---|---|---|
| 4,813,010 A | 3/1989 | Okamoto et al. |
| 5,249,240 A | 9/1993 | Nakayama |
| 5,291,397 A | 3/1994 | Powell |
| 5,303,170 A | 4/1994 | Valko |
| 5,548,506 A | 8/1996 | Srinivasan |
| 5,798,950 A | 8/1998 | Fitzgerald |
| 5,918,219 A | 6/1999 | Isherwood |
| 6,317,700 B1 | 11/2001 | Bagne |
| 6,322,366 B1 | 11/2001 | Bergan et al. |
| 6,571,285 B1 | 5/2003 | Groath et al. |
| 6,681,211 B1 | 1/2004 | Gatto |

(Continued)

FOREIGN PATENT DOCUMENTS

| | | |
|---|---|---|
| JP | 04223851 | 8/1992 |
| WO | WO01/80124 | 10/2001 |

OTHER PUBLICATIONS

Pyron, Tim, Teach Yourself Microsoft Project in 24 hours Sames Publishing, May 1998.*

(Continued)

*Primary Examiner* — Scott L Jarrett
(74) *Attorney, Agent, or Firm* — Perkins Coie LLP

(57) ABSTRACT

The present invention relates to designating that durations of specific tasks are estimated or tentative. The user can indicate estimated durations by the sheet mode or the dialog mode. Estimated duration characters are symbols of uncertainty, such as "?", that indicate that the duration entries are not fixed and final, but may need to be adjusted in the future. The user can select an option to not display the estimated duration character even though the estimated field for the task is set. The user can also select an option to have new tasks that are created have estimated duration characters until the user chooses to enter a duration value. The program can also filter the task list to display only tasks that have estimated duration characters.

18 Claims, 9 Drawing Sheets

(56) References Cited

U.S. PATENT DOCUMENTS

| | | | |
|---|---|---|---|
| 6,687,902 B1 | 2/2004 | Curtis et al. | |
| 6,889,196 B1* | 5/2005 | Clark | 705/7.12 |
| 7,249,042 B1* | 7/2007 | Doerr et al. | 705/7.23 |

OTHER PUBLICATIONS

Palisade.com—Web Pages Mar./Jun. 2000, Retrieved from Arhive.org Sep. 23, 2005.*

Palisade.com Web Pages May-Jun. 2000, Retrieved from Archive.org Apr. 5, 2006.*

Cummings, Nigel, @Risk delivers richer picture Operational Research Society Newsletter, Feb. 1999.*

Palisade.com—Web Pages Palisade, Dec. 2000-Jan. 2001, Retrieved from Archive.org Mar. 4, 2013.*

Sugiyama, Sam O. et al., @Risk, Riskview and BestFit ORMS Today, vol. 24, No. 2, Apr. 1997.*

@Risk for Project Palisade, Unknown Date.*

Uncertainty & Risk Analysis—A Practical guide from Business Dynamics PriceaterhouseCoopers, Apr. 1999.*

Finely, Eric et al., "Project Scheduling Risk Assessment Using Monte Carlo Methods Cost Engineering," Oct. 1994, vol. 36, No. 10, p. 24-28.

Ranasinghe, Malik, "Quantification and Management of Uncertainty in Activity Duration Networks Construction Management and Economics," Jan. 1994, vol. 12, No. 1, Abstract.

Yahng, Kum-Khiong, "Effects for Erroneous Estimation of Activity Duration on Scheduling and Dispatching a Single Project," Decision Sciences, Spring 1996, vol. 27, No. 2, pp. 255-290.

Ock, Jong H., "Activity Duration Quantification Under Uncertainty," Fuzzy Set Theory Application Cost Engineering, Jan. 1996, vol. 38, No. 1.

Dawood, Nashwan, "Estimating Project and Activity Duration: A Risk Management Approach Using Network Analysis Construction Management and Economics," Jan. 1998, vol. 16, No. 1 Abstract.

Marsh, Thomas, Palisade Upgraces @Risk software, Corporation Finance, Sep. 1998, No. 166.

Cummings, Nigel, @Risk Delivers Richer Picture, Operational Research Society—OR Newsletter, Feb. 1999.

ScramSoftware.com Web Pages Apr. 2000, Retrieved from Archive.org Apr. 5, 2006.

Palisade.com Web Pages May-Jun. 2000, Retrieved from Archive.org Apr. 7, 2006.

Pyron, Tim, "Teach Yourself Microsoft Project 98 in 24 Hours," Sams Publishing, May 1998, ISBN: 0-672-31258-1.

Essentials of Expressing Measurement Uncertainty, The NIST Reference on Constants, Units and Uncertainty, Retrieved from Physics,nist.gov, Apr. 7, 2005.

Microsoft Project 2000 Product Enhancement Guide, Microsoft, Oct. 1999.

Pyron et al., "Using Microsoft Project 2000 Special Edition," Que; Sep. 21, 2000, ISBN:0789722534.

Chatfield, Carl S., et al., Microsoft Project 2000 Step by Step, Microsoft Press, Jun. 3, 2000, ISBN: 0735609209.

Black, Ron, "Complete Idiot's Guide to Project Management with Microsoft Project 2000," Alpha, Apr. 5, 2000, ISBN: 0789722712.

Primavera Project Planner—Planning and Control Guide Verison 3.0, Primavera Systems, Inc. 1999.

A Guide to the Project Management Body of Knowledge, Project Management Institute, 1996, ISBM: 1-8880410-13-3.

Palisade.com—Web Pages, Mar./Jun. 2000, Retrieved from Archive.org Sep. 23, 2005.

Pyron, Tim et al., "Using Microsoft Project 4 for Windows," Apr. 20, 1994, pp. 1-2, 5, 35, 38, 55, 57, 61-62, 118, 181, 214, 325, 341, 448-449, 454-455, 548, 469, 478-479, 516, 554, 618-619, 632, 668 and 675.

* cited by examiner

FIG. 8

Task Information

| General | Predecessors | Resources | Advanced | Notes |

Name: Install Cabinets — 805

Percent complete: 0%    Priority: 500    Duration: 2w? — 810    ☑ Estimated — 815

Dates

Start: Thu 10/26/00    Finish: Wed 11/8/00

☐ Hide task bar
☐ Roll up Gantt bar to summary

Help — 830    OK — 820    Cancel — 825

800

METHOD AND SYSTEM FOR VISUALLY INDICATING PROJECT TASK DURATIONS ARE ESTIMATED USING A SINGLE CHARACTER

CROSS-REFERENCE TO RELATED APPLICATION(S)

This application is a continuation of U.S. patent application Ser. No. 09/704,638 filed on Nov. 1, 2000 entitled "METHOD AND SYSTEM FOR INDICATING THAT DURATIONS ARE ESTIMATED," which application is hereby incorporated by reference in its entirety.

TECHNICAL FIELD

The present invention relates to the display of information in a project status report. More specifically, the invention relates to designating that durations of specific tasks are estimated or tentative.

BACKGROUND

As computer programs have advanced in the project management field, duration planning capabilities have been included. In the past, duration planning capabilities have only allowed a user to display and track definite durations. Conventional systems do not allow the user to indicate that durations are tentative or estimated. Users are thus hesitant to use these duration planning capabilities because they make durations seem to be set in stone, and raise false expectations about when projects and tasks will be finished.

In past products, advanced project management users could enter multiple durations for a project or task. These products allowed advanced users to enter best case, worst case, and expected durations. However, these products were complicated and were not user-driven in terms of letting the user express uncertainty about a duration. Instead, these products only allowed the user to input multiple guesses and then the program would combine the multiple guesses. Not only are estimated durations useful in indicating that projects or tasks are estimated, they are easy for novice users to access.

In view of the foregoing, there is a current need in the art to replace a presentation of product or task duration data with quickly recognizable text for identifying that a duration is estimated or tentative. In particular, novice users without extensive project management training need a simple system to indicate that durations for projects and tasks are estimated. There is also a current need for a user to be able to select an option to have new tasks that are created have estimated duration characters until the user chooses to enter a duration value. There is a further need in the art for a user to be able to filter the task list to display only tasks that have estimated durations.

SUMMARY OF THE INVENTION

The present invention solves the above problems by allowing the user to indicate that durations of specific tasks are estimated or tentative. A field can be a location that contains specific information about a task. A duration field can be a location that contains information about a task duration. An estimated duration field can be a location that contains information about whether or not a task duration is estimated.

The user can indicate estimated durations by sheet mode or dialog mode. Estimated duration characters can be symbols of uncertainty, such as "?", that indicate that the duration entries are not fixed and final, but may need to be adjusted in the future. In the sheet mode, the user can enter a duration value (i.e. "2 wks") with an estimated character (i.e., "?") in the entry field. This entry field data (i.e. "2 wks?") can be parsed or cut off and the parser can then set the estimated field to "yes." In the dialog mode, the user can set the estimated field to "yes" or "no" by marking the duration field as estimated with an estimated duration character (i.e. "3 days?") or by marking a checkmark in the estimated field. In the dialog mode, the dialog's estimated field and the duration field can be constantly kept in sync. The program can process and display estimated durations with a default estimated duration character (i.e. "?") or an alternate estimated duration character (i.e. "*" or "~").

A hierarchical arrangement of tasks is often used in the project management field. The lowest level in the task hierarchy is nonsummary tasks or subtasks. The intermediate levels in the task hierarchy are summary tasks. The top level in the task hierarchy is a project summary task. If a summary task has at least one nonsummary (or child) task which is estimated, then the summary task will be estimated.

The user can select an option to not display the estimated duration character even though the estimated field for the task is set. The user can also select an option to have new tasks that are created have estimated duration characters until the user chooses to enter a duration value. The program can also filter the task list to display only tasks that have estimated duration characters.

The present invention can include a user interface (UI), a parser, three types of storage (duration value, duration display type, estimated field), and a display. The UI can interact with the user and the rest of the system. The parser can be a text converter. The parser can break the input data into small chunks of data that can be interpreted. The storage can consist of a duration value memory, a duration display type memory, and an estimated flag memory. The duration value memory can store the duration value, which is the value that is internally used. The duration display type memory can store the duration display type, which indicates the way the duration should be displayed (i.e., days, weeks, months). The estimated flag memory can store the estimated flag, which indicates whether or not an estimated duration character should be displayed. The display can be a component that keeps information about what will be shown on the system's visual output devices (i.e., a computer screen). The display can pull information from the duration value memory, the duration display type memory, and the estimated flag memory, and then can combine this information and output human readable text.

The aforementioned advantages of the invention, as well as additional advantages thereof, are more fully described by the detailed description of exemplary embodiments and the accompanying drawings.

BRIEF DESCRIPTION OF THE DRAWINGS

FIG. 8 is a screen displays illustrating an exemplary embodiment of the dialog mode.

DETAILED DESCRIPTION

The present invention provides a method and system for displaying estimated duration characters that indicate that durations of specific tasks are estimated or tentative. By using estimated duration characters, the user can get a quick and easy visualization of estimated tasks.

Figure 1:
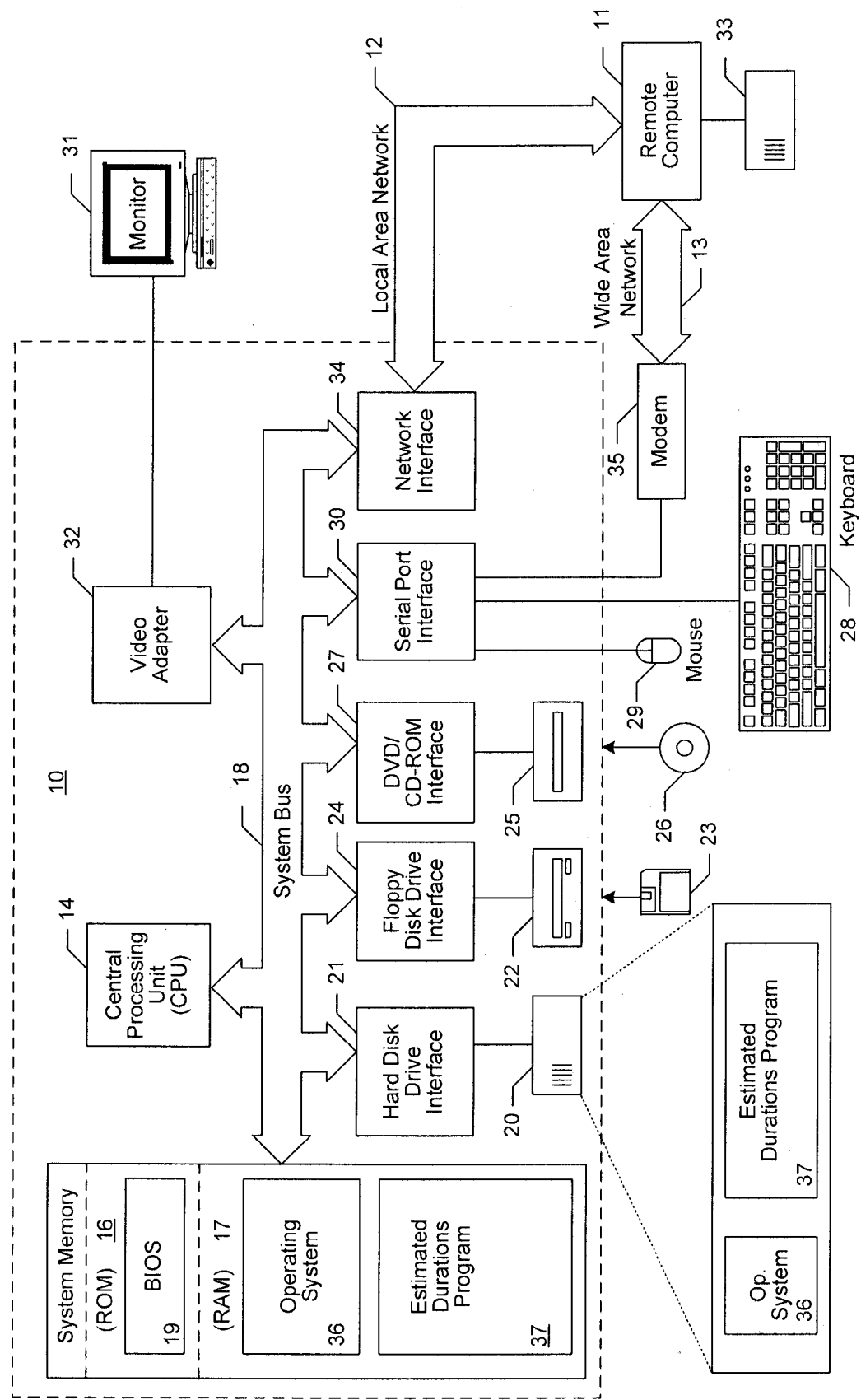
FIG. 1 is a block diagram of a personal computer that provides an operating environment for an exemplary embodiment of the present invention.
Figure 2:
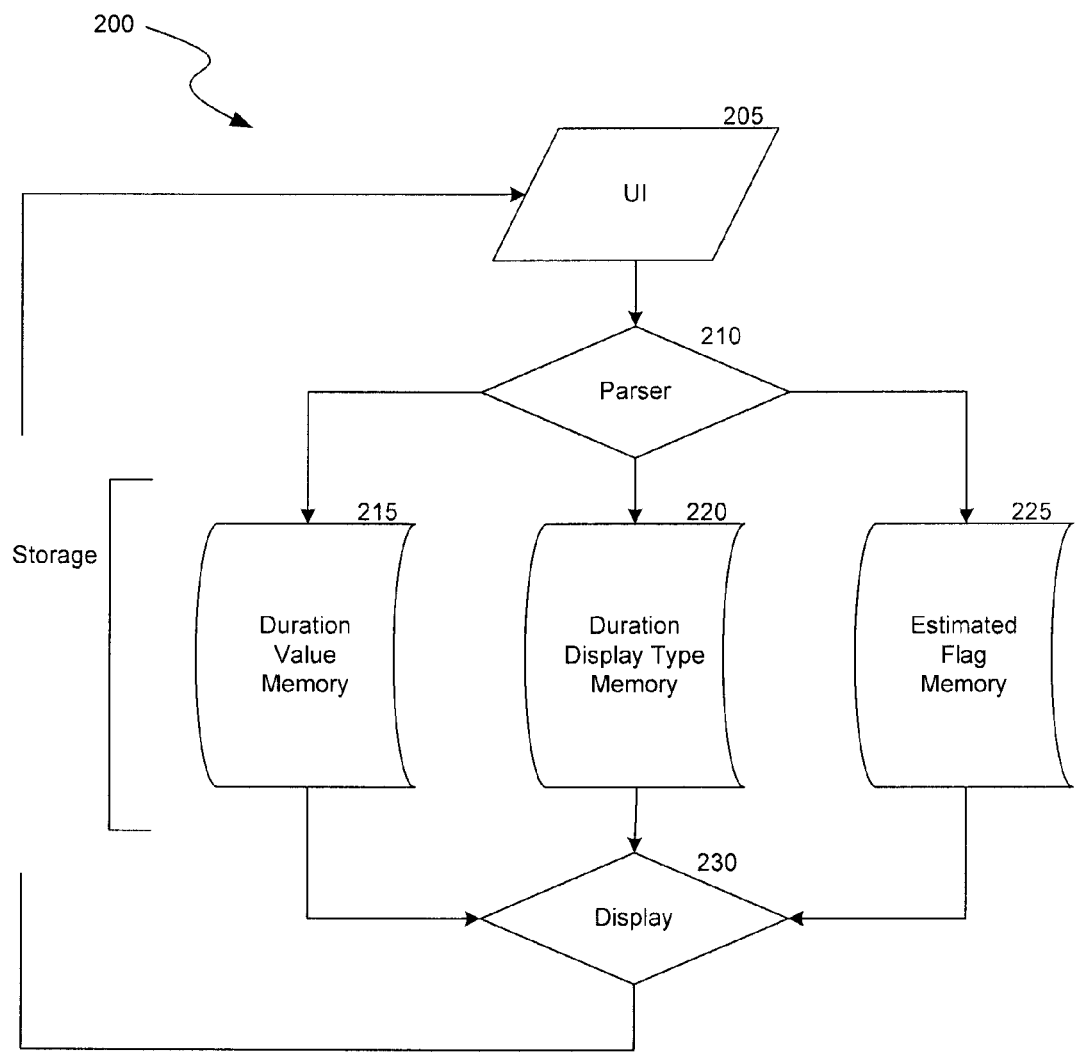
FIG. 2 is a functional block diagram illustrating an exemplary embodiment which can report actions between a UI, a parser, a duration value memory, a duration display type memory, an estimated flag memory, and a display.
Figure 9:
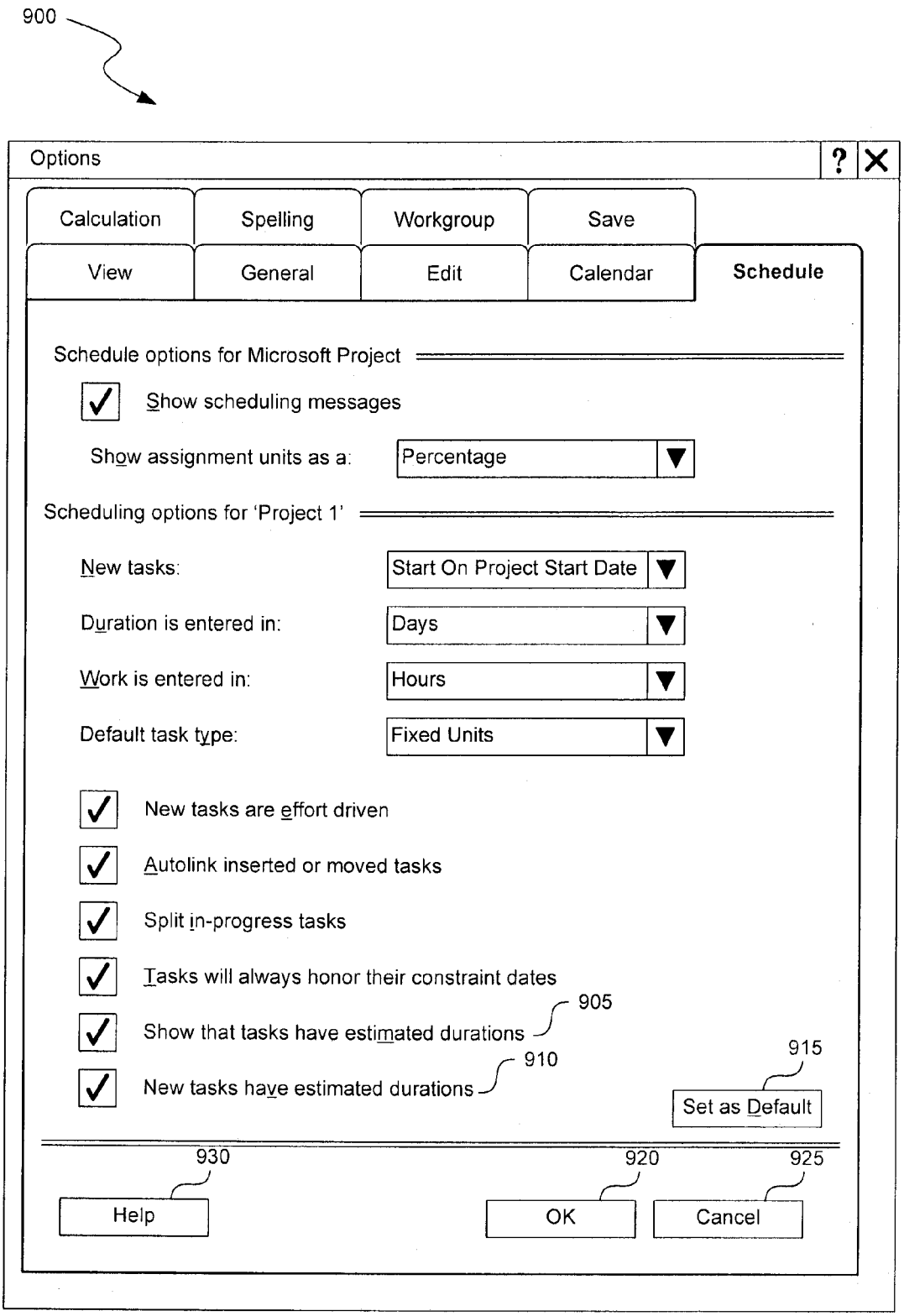
FIG. 9 is a screen display illustrating some estimated durations options available in an exemplary embodiment of the present invention.

FIG. 1 is a block diagram of a personal computer that provides an exemplary operating environment. FIG. 2 is a block diagram illustrating internal objects. FIGS. 3-6 are flow diagrams illustrating exemplary methods for entering and displaying estimated duration characters. FIGS. 7-9 are screen displays illustrating an exemplary embodiment of the current invention.

Although an exemplary embodiment will be generally described in the context of a client program module and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

Referring now to the drawings, in which like numerals represent like elements throughout the several figures, aspects of the present invention and an exemplary operating environment will be described.

FIG. 1 illustrates various aspects of an exemplary computing environment in which the present invention is designed to operate. Those skilled in the art will immediately appreciate that FIG. 1 and the associated discussion are intended to provide a brief, general description of an exemplary computer hardware and program modules, and that additional information is readily available in the appropriate programming manuals, user's guides, and similar publications.

FIG. 1 illustrates a conventional personal computer 10 suitable for supporting the operation of an exemplary embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a central processing unit (CPU) 14. The personal computer also includes system memory 15, including read only memory (ROM) 16 and random access memory (RAM) 17), which is connected to the CPU 14 by a system bus 18. An exemplary computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM or DVD drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that an operating system 36 and one or more program modules, such as a estimated durations program 37, are provided to the personal computer 10 via computer-readable media. In an exemplary computer, the computer-readable media include the local or remote memory storage devices, which may include the local hard disk drive 20, floppy disk 23, CD-ROM or DVD 26, RAM 17, ROM 16, and the remote memory storage device 33. In an exemplary personal computer 10, the local hard disk drive 20 is used to store data and program modules, including the operating system 36 and a estimated durations program 37.

The focus of the estimated durations program 37 is described below in connection with FIGS. 2-9. In an exemplary embodiment, the estimated duration characters are used for project management in planning, monitoring, and controlling the development of a particular undertaking. The product management information is usually listed in a grid or spreadsheet comprising rows and columns to display project items and status. The project management information is entered in fields.

A field is a location (such as the intersection of a column and a row in a grid) that contains a specific kind of information. A field can be a location that contains specific information about a task. A duration field can be a location that contains information about a task duration. An estimated duration field can be a location that contains information about whether or not a task duration is estimated.

The user can indicate estimated durations by the sheet mode or the dialog mode. Estimated duration characters are symbols of uncertainty, such as "?", that indicate that the duration entries are not fixed and final, but may need to be adjusted in the future. A user can specify that an estimated duration character be displayed in a field of the grid. In the sheet mode, the user enters a duration value (i.e. "2 wks") with an estimated duration character (i.e., "?") in the entry field. This entry field data (i.e. "2 wks?") is parsed or cut off and the parser can then set the estimated field to "yes". In the dialog mode, the user sets the estimated field to "yes" or "no" by marking the duration field as estimated with an estimated duration character (i.e. "2 wks?") or by marking a checkmark in the estimated field. In the dialog mode, the dialog's estimated field and the duration field are constantly kept in sync. The program can process and display estimated durations with a default estimated duration character (i.e. "?") or an alternate estimated duration character (i.e. "*" or "~").

A hierarchical arrangement of tasks is often used in the project management field. The lowest level in the task hierarchy is nonsummary tasks or subtasks. The intermediate levels in the task hierarchy are summary tasks. The top level in the task hierarchy is a project summary task. If a summary task has at least one nonsummary (or child) task which is estimated, then the summary task will be estimated.

The user can select an option to not display the durations with the default estimated duration character even though the estimated field for the task is set. The user can also select an option to have new tasks that are created have estimated duration characters until the user chooses to enter a duration value. The program can also filter the task list to display only tasks that have estimated duration characters.

The Internal Objects

Turning now to FIG. 2, exemplary embodiments of the present invention are described. FIG. 2 is a functional block diagram illustrating an exemplary system 200 comprising a user interface (UI) 205, a parser 210, three types of storage (duration value memory 215, duration display type memory 220, estimated flag memory 225), and a display 230. The UI 205 interacts with the user and the rest of the system. The parser 210 is a text converter. The parser 210 breaks the input data into small chunks of data that can be interpreted. The storage consists of a duration value memory 215, a duration display type memory 220, and an estimated flag memory 225.

The duration value memory 215 stores the duration value, which is the value that is internally used. For example, when the user enters "3 days", this is internally stored as a duration value of "1440 minutes". The duration display type memory 220 stores the duration display type, which is the way the duration should be displayed. Durations can be displayed as minutes, hours, days, weeks, or months. When the user enters "2 wks?", the duration display type memory 220 stores information that indicates that durations should be displayed as weeks. The display also understands abbreviations of alterations of the works minutes, hours, days, weeks, or months. Thus entries such as "3 dys", "3 yrs", or "3 wks" are understood. The estimated flag memory 225 stores the estimated flag, which indicates whether or not an estimated duration should be shown. The display indicates what will be shown on the system's visual output device (such as a computer screen). The display pulls information from the duration value memory 215, the duration display type memory 220, and the estimated flag memory 225, combines this information and outputs human readable text.

The Flow Diagrams

The present invention solves the above problems by allowing the user to indicate that durations of specific tasks are estimated or tentative. The user can do this by the sheet mode or by the dialog mode.

Figure 3:
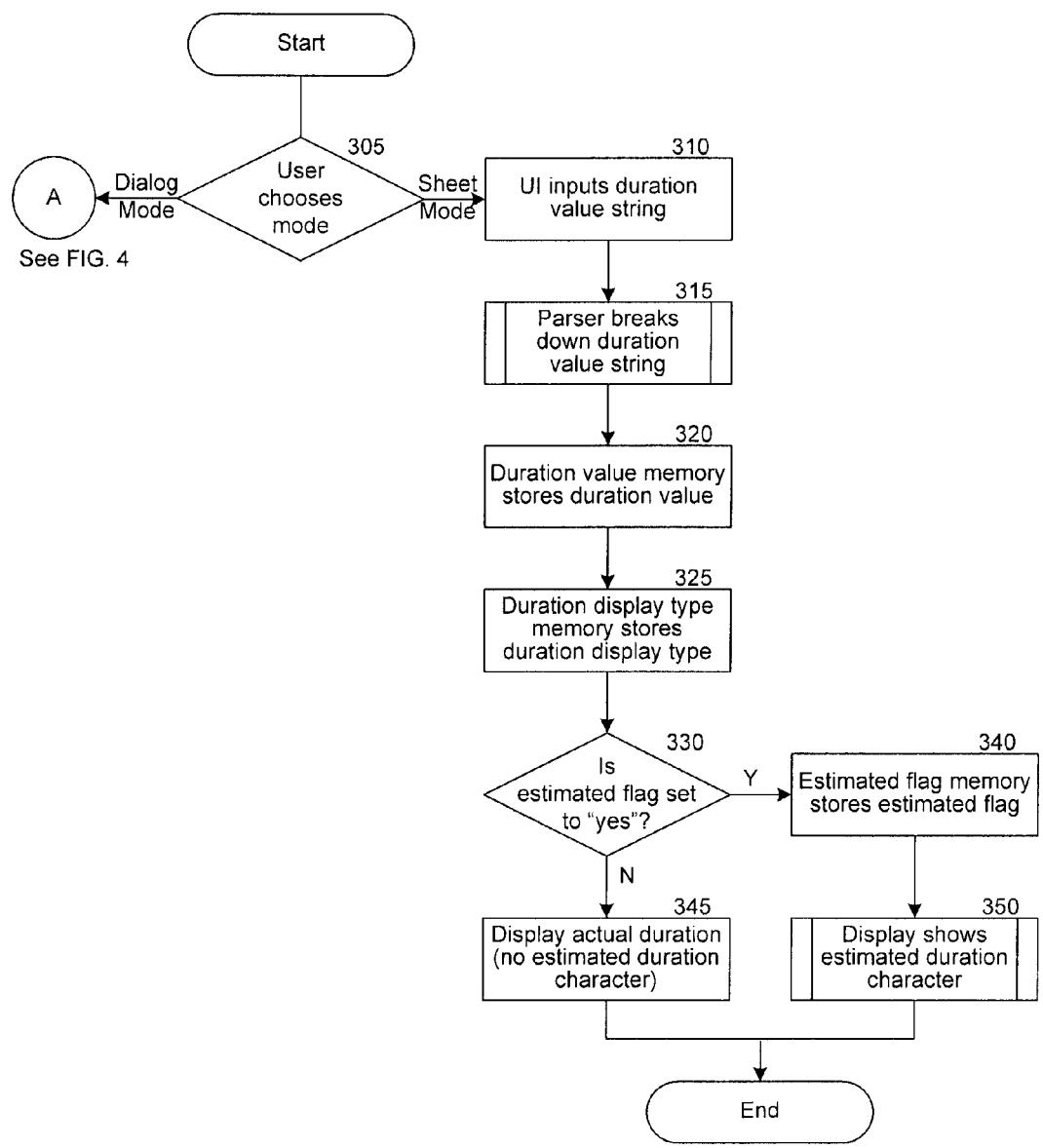
FIG. 3 is a flow diagram illustrating an exemplary method for entering and displaying estimated duration characters using the sheet mode.

FIG. 3 is a flow diagram illustrating the overview of an exemplary method for entering and displaying estimated duration characters using the sheet mode. In step 305, the user chooses to use the sheet mode through the UI 205. In step 310, the user uses the UI 205 to input a duration value string in the entry field. In step 315, the parser 210 breaks down the estimated duration string into the estimated duration character, duration display type, and duration value. In step 320, the duration value memory 215 stores the duration value. In step 325, the duration display type memory 220 stores the duration display type. In step 330, the display asks if the estimated flag is set to "yes". If the answer to step 330 is "yes", an estimated flag is stored in the estimated flag memory 225 in step 340. Then the display shows the estimated duration character in step 350.

If the answer to step 330 is "no", then the display shows the duration value string that the user entered, and no estimated duration character is shown, as set forth in step 345.

Figure 4:
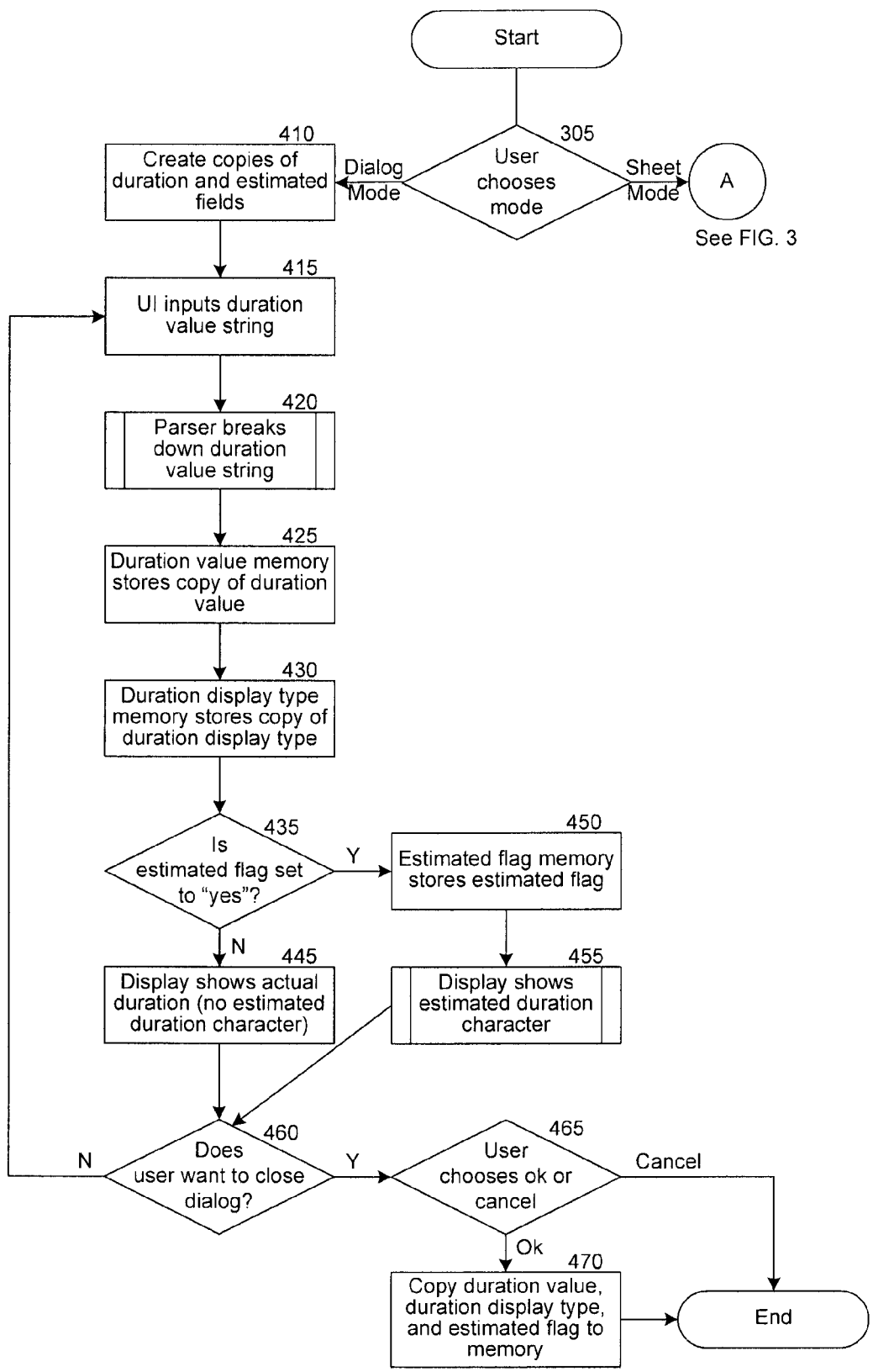
FIG. 4 is a flow diagram illustrating an exemplary method for entering and displaying estimated duration characters using the dialog mode.

FIG. 4 is a flow diagram illustrating the overview of an exemplary method for entering and displaying estimated duration characters using the dialog mode. In step 305, the user chooses to use the dialog mode through the UI 205. In step 410, the UI 205 creates copies of the duration field and the estimated field. In step 415, the user access the UI 205 to input the duration value string into the entry field. In step 420, the parser 210 breaks down the duration value string into estimated duration character, duration display type, and duration value. In step 425, the duration value memory 215 stores a copy of the duration value. In step 430, the duration display type memory 220 stores a copy of the duration display type. In step 435, the display determines if the estimated flag is set to "yes". If the answer is "yes", the estimated flag memory stores the estimated flag in step 450. Then the display shows the estimated duration character in step 455.

If the answer to step 435 is "no", then the display shows the actual duration (the duration value string that the user entered), and no estimated duration character is shown, as set forth in step 445.

In step 460, the user chooses whether or not to close the dialog box. If the answer to 460 is "no", and the user does not want to close the dialog box, the process skips back up to step 415. If the answer to step 460 is "yes", and the user does want to close the dialog box, the user can do this by choosing "OK" or "Cancel" in step 465. If "OK" is chosen, then the three storage memories (the duration value memory 215, the duration display type memory 220, and the estimated flag memory 225) copy the duration value, the duration display type, and the estimated flag, as set forth in step 470. If the "Cancel" option is chosen in step 465, the process ends without copying this information.

Figure 5:
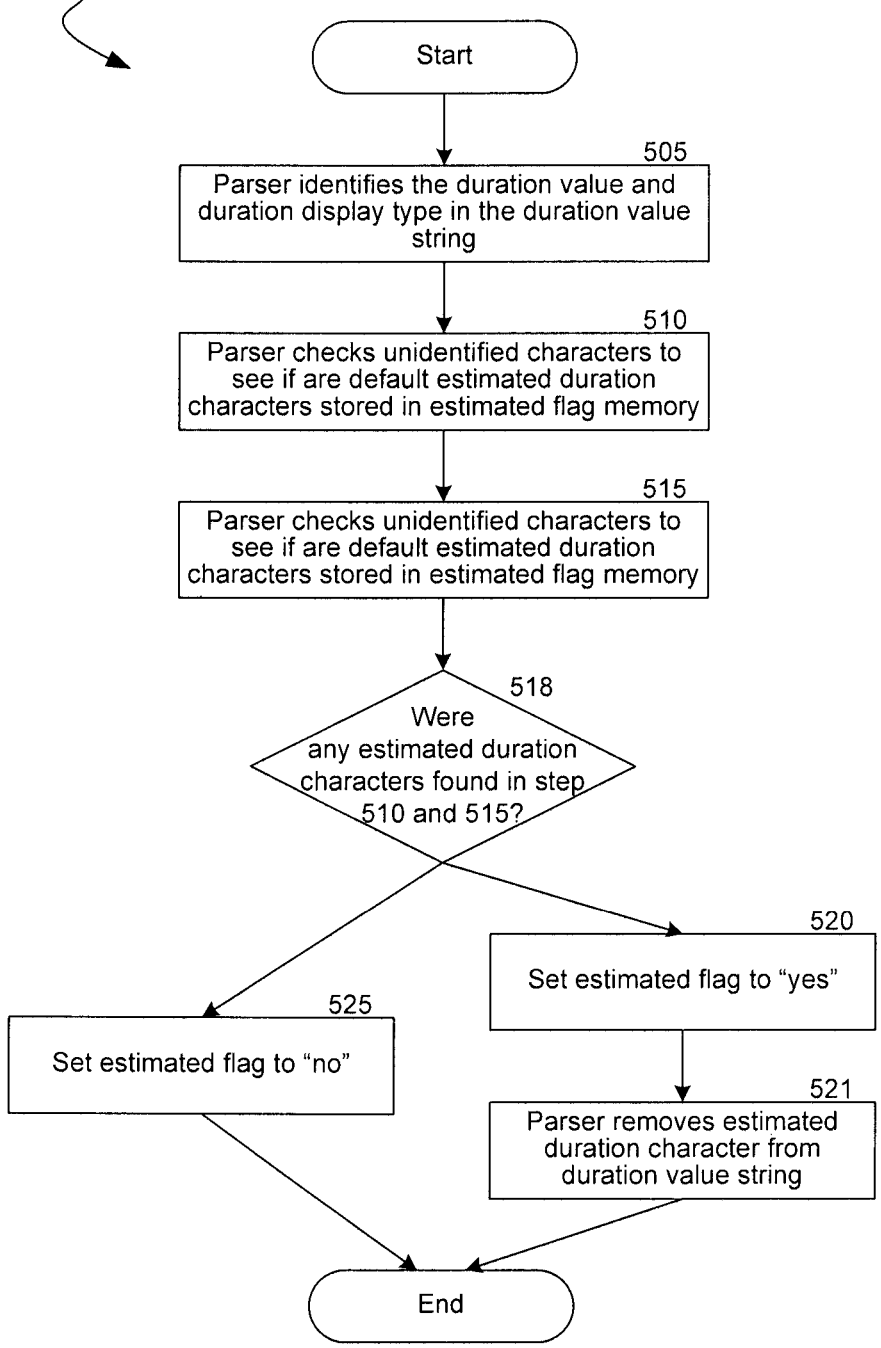
FIG. 5 is a flow diagram illustrating an exemplary method for how the parser breaks down the duration value string.

FIG. 5 is a flow diagram illustrating how the parser 210 breaks down the duration value string, as set forth in step 315 of FIG. 3 and 420 of FIG. 4. In step 505, the parser 210 identifies the duration value and the duration display type from the duration value string. For example, "2 wks?" could be entered, and the parser 210 would identify "2" as the duration value and "wks" as the duration display type. In step 510, the parser 210 checks the remaining characters in the duration value string to see if it is the default estimated duration character in the estimated flag memory 225. In the example of "2 wks?", the parser 210 will check to see if "?" is in the estimated flag memory 225. The parser 210 then checks any remaining characters in the duration value string to see if it is an alternate estimated duration character stored in the estimated flag memory 225, as set forth in step 515. An example of an alternate estimated duration character is "*" or "~". In step 518 the parser asks if an estimated duration character was found in steps 510 or 515. If the answer to step 518 is "yes", the process steps to skip 520, where the estimated flag is set to "yes". Then the parser 210 removes the default estimated characters and alternate estimated characters from the duration value string, and completes the normal parsing process, as set forth in step 521. If the answer to step 518 is "no", the estimated flag is set to "no", as set forth in step 525. After setting the estimated flag to "yes" or "no" as set forth in steps 520-521 and 525, the process skips to step 320 of FIG. 3 and step 425 of FIG. 4.

Figure 6:
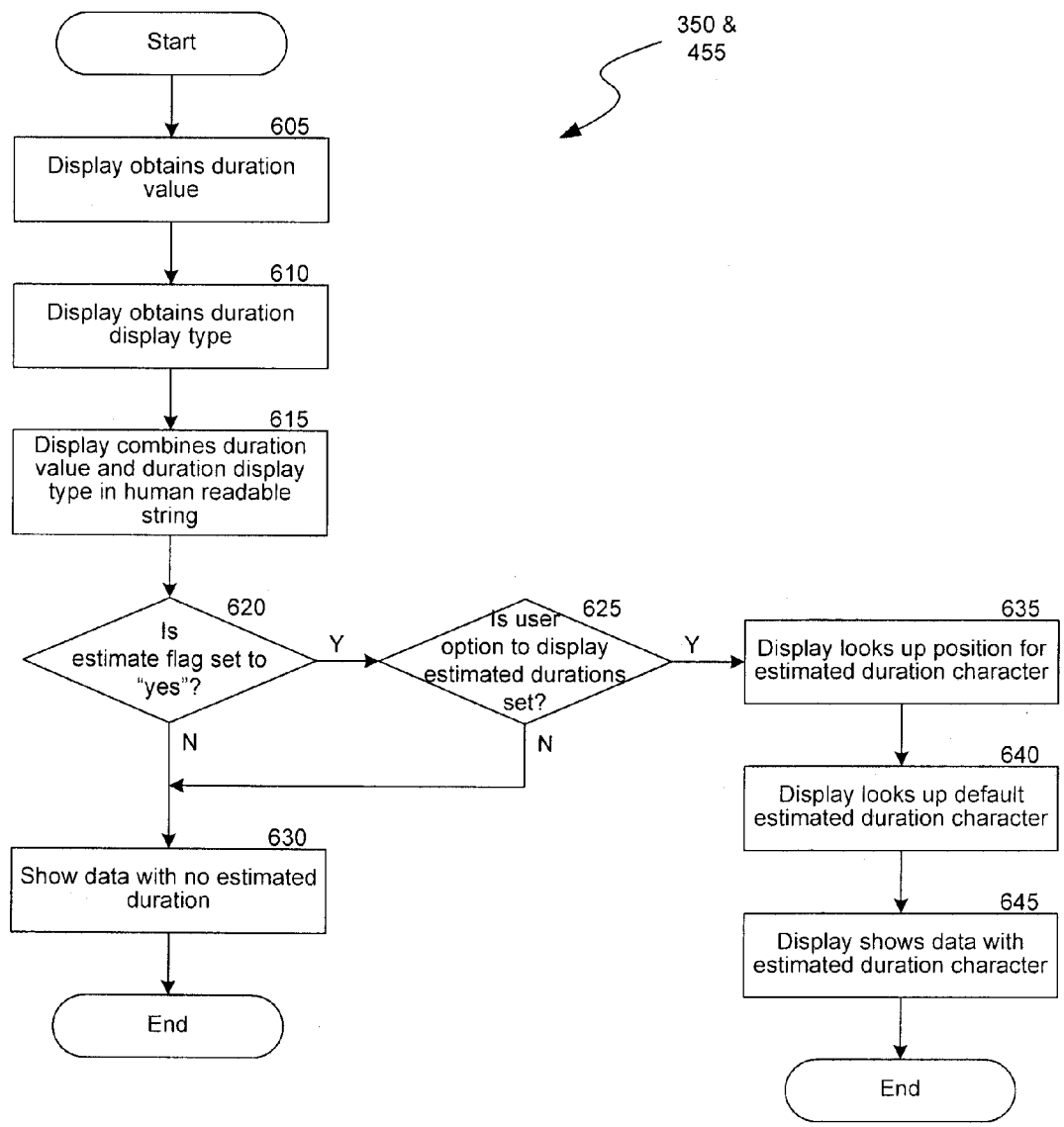
FIG. 6 is a flow diagram illustrating an exemplary method for displaying estimated duration characters.
Figure 7:
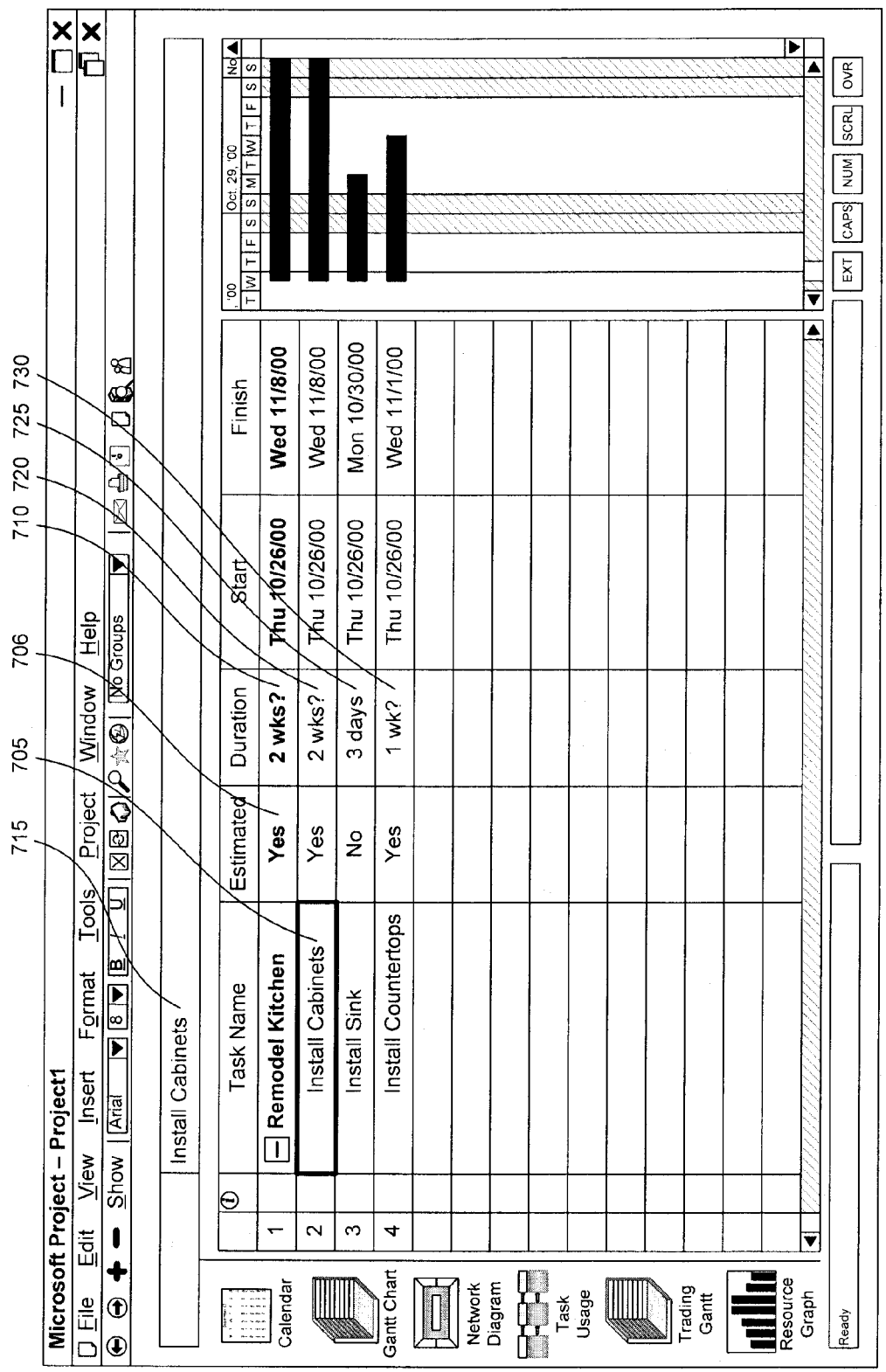
FIG. 7 is a screen display illustrating an exemplary embodiment of the sheet mode, using project management data present in a grid format.

FIG. 6 is a flow diagram illustrating an exemplary method for displaying estimated duration characters, as set forth in step 350 of FIG. 3 and steps 455 of FIG. 4. In step 605, the display obtains the duration value from the duration value memory 215. In step 610, the display obtains the duration display type from the duration display type memory 220. In step 615, the display combines the duration value and duration display type into a duration value string that is a human readable string. In step 620, the display asks the estimated flag memory 225 if the estimated flag is set to "yes". If the answer to step 620 is "no", the process skips to 630, where the display shows the duration value string with no estimated duration on the end. If the answer to step 620 is "yes", the display asks if the user option to display estimated duration is set. If the answer to 625 is "no", the process skips to step 630. If the answer to step 625 is "yes", the display looks up the estimated duration position in step 635. In step 640, the display looks up the default estimated duration (i.e. "?"). In step 645, the display shows the data with the estimated duration in the correct position.

The Screen Displays

In an exemplary embodiment of the present invention, the user can input estimated duration characters for project management tasks. For a representative project management example, the estimated duration characters will illustrate if project tasks are strict or estimated or tentative. The estimated duration characters will indicate the task status. For example, a user could use the exemplary embodiment to track the remodeling of his kitchen and to indicate that certain tasks in the project of remodeling his kitchen are estimated.

To illustrate the operation of this exemplary embodiment, we will assume that the user has a project management file that contains a list of tasks with data entered into various fields. This information will be in a grid format where each field represents one column of one row. We also assume that the project is underway and various tasks have been scheduled.

The estimated duration choice allow the user to enter the conditions for displaying the estimated durations in different levels. In an exemplary embodiment, there are three levels for project management information: nonsummary, summary, and project summary. If a summary task has at least one nonsummary (or child) task which is estimated, then the summary task will be estimated.

FIG. 7 is a screen display illustrating an exemplary embodiment using the sheet mode, using project management data present in a grid format. Field 705 is a name field, where the task name "Remodel Kitchen" has been entered. Field 706 is an estimated field. Field 710 is a duration field, and is where the estimated duration characters are indicated. Because the duration of field 710 is a summary type, field 710 will automatically indicate that it is an estimated duration if any of its subtasks 720, 725, or 730 are estimated durations. Field 715 is an entry field, and is sometimes refereed to as an entry bar.

As set forth in step 310 of FIG. 3, the user can use the entry field 715 to type in the estimated duration characters. For example, the user can enter "2 weeks?". The user does this by highlighting the field 720 and entering "2 wks?" in the entry field 715. When the user presses the enter key, this information will be displayed in the field 720. Following step 315, the parser 210 breaks down "2 wks?" into "?" "wks" and "2 wks" As set forth in steps 320-325, the information "weeks" is stored in the duration display type memory 220 and "2 wks" is stored in the duration value memory 215 as the number of minutes ("4800 minutes") in "2 wks". Following step 330, the display takes "?" and asks if it is an estimated duration character. Because "?" matches the character stored as the default character in the estimated flag memory 225, an estimated flag is set to "yes" in the estimated flag memory 225 as set forth in step 340. The display then shows the estimated duration character "?" in field 720 as set forth in step 350.

FIG. 8 is a screen display illustrating an exemplary embodiment using the dialog mode for the above project management example. The user can access the Task Information dialog box by double-clicking on field 720 of FIG. 7, or using the tool bar command to display the Task Information dialog box. This Task Information dialog box 800 can be used to specify whether or not durations are estimated. In the representative example, the user can choose to enter "?" in the duration field 810 or the user can choose to check the estimated field 815 for the field named Remodel Kitchen 805. With dialog mode, the duration field 810 and estimated field 815 are inputted and stored dynamically. For example, when the user enters "2 wks?" in the duration field 810, as soon as the user types in "?", the estimated field 815 is checked. The user can only use these options if the task is a nonsummary task. If the task is a summary task, then these options are grayed out and are not available to the user. Once the user enters the estimated duration information in box 810 or 815, he can choose the "OK" 820 to enter the information and return to the project screen 700, or he can enter the "Cancel" 825 and return to the project screen 700 without entering the estimated durations information. The user can access the "Help" 830 button if the user needs help understanding the estimated durations function or other functions of the dialog box.

FIG. 9 is a representative screen display illustrating the estimated durations options available in the project management example. The checkbox for "Show that tasks have estimated durations" 905 determines whether the estimated duration characters will be shown on the project screen 700. By not checking this box, the user can choose to not display the estimated duration characters with the default estimated duration character, even though the estimated field is checked. Thus, if the checkbox 905 is not checked, the user will be able to enter "?" or other estimated duration characters in the project screen 700, but the estimated duration characters won't be displayed.

The checkbox for "New tasks have estimated durations" 910 allows the user to select the option to have new tasks that are created have the estimated flag set until the user chooses to enter a duration value. Checkbox 905 or 910 can be "Set as Default" 915 so that all new projects created have these settings. Once the user checks or does not check box 905 or 910, he can choose the "OK" 920 to enter the information and return to the project screen 700, or he can enter the "Cancel" 925 and return to the project screen 700 without entering the estimated durations options information. The user can access the "Help" 930 button if the user needs help understanding the estimated durations function or other functions of the dialog box.

The user also has the option to filter the task list to display only tasks that have estimated duration characters. The user can filter in two ways. First, the user can access an "Auto filters" option and select an "estimated durations" item. Second, the user can create a filter that references the estimated field.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method in a project planning system for specifying durations of project tasks that are not yet completed, the method comprising:
    receiving from a user a duration value string including a duration of a project task that is not yet completed and including a duration display type, wherein the duration of the project task is a numerical value of time and the duration display type indicates units of the numerical value of time;
    storing the duration and indication of the duration display type;
    determining by a processor of a computing system whether the received duration value string includes an estimated duration character indicating that the duration is estimated, the estimated duration character being a single character;
    when it is determined that the received duration value string includes the estimated duration character indicating that the duration is estimated, setting an estimated flag to indicate that the duration of the project task is estimated;
    when the duration of the project task is no longer estimated, updating the duration and setting the estimated flag to indicate that the duration of the project task is not estimated;
    when displaying the duration of the project task and the estimated flag that indicates that the duration of the project task is estimated, displaying an indication of the duration, an indication of the duration display type, and an indication that the duration is estimated; and
    when displaying the duration of the project task and the estimated flag indicates that the duration of the project is not estimated, displaying an indication of the duration and an indication of the duration display type without displaying of an indication that the duration is estimated.

2. The method of claim 1 wherein the received character of the duration value string and the displayed indication are in different formats.

3. The method of claim 1 wherein project tasks are hierarchically organized and wherein when a parent project task has at least one child project task whose duration is estimated, indicating that the duration of the parent project task is estimated.

4. The method of claim 1 including upon receiving a request to display only project tasks whose durations are estimated, displaying an indication of such project tasks.

5. The method of claim 1 including upon receiving an indication to change the duration of the project task from estimated to definite, storing an indication that the duration of the project task is definite.

6. A computer-readable medium containing instructions for controlling a computer system to specify durations of tasks in a project management system, by a method comprising:
    receiving from a user a duration value string including a duration of a project task, a duration display type, and an indication as to whether the duration of the project task is estimated or definite, wherein the duration of the project task is a numerical value of time, wherein the duration display type indicates units of the numerical value of time, and wherein the duration of the project task is indicated as being estimated or definite by the presence or absence of an estimated duration character in the duration value string, the estimated duration character being a single character;
    storing in association with the project task the received duration of the project task, an indication of the units of the numerical value of time, and an estimated flag indicating whether the duration of the project task is estimated;
    when the duration of the project task that is estimated becomes known, updating the duration and storing the estimated flag to indicate that the duration of the project task is definite; and
    when displaying the duration of the project task,
    displaying the duration and an indication of the units of the numerical value of time;
    when the estimated flag indicates that the duration of the project task is estimated and needs to be adjusted when a definite duration value is known, displaying the estimated duration character; and
        when the estimated flag indicates that the duration of the project is definite, suppressing the displaying of the estimated duration character.

7. The computer-readable medium of claim 6 wherein tasks are hierarchically organized and wherein when a parent task has at least one child task whose duration is estimated, indicating that the duration of the parent task is estimated.

8. The computer-readable medium of claim 6 including upon receiving a request to display only tasks whose durations are estimated, displaying an indication of each such task.

9. The computer-readable medium of claim 6 wherein the duration is set to estimated by default.

10. The computer-readable medium of claim 6 including upon receiving an indication to change the duration of the task from estimated to definite, storing an indication that the duration of the task is definite.

11. A computer-implemented method for specifying and displaying whether a project task duration of a project plan is estimated in a project management system, the method comprising:
 displaying a project task duration field and a duration estimated field;
 receiving from a user a project task duration string via the project task duration field, the project task duration string including a project task duration value and a project task duration display type, the project task duration value being a numerical value of time and the project task duration display type indicating units of the numerical value of time;
 parsing by a processor of a computing system the project task duration string to identify the project task duration value, the project task duration display type, and whether the project task duration field contains a project task estimated character that is a single character;
 storing an indication of the project task duration value and the project task duration display type;
 when the project task duration string includes a project task estimated character indicating that the project task duration is estimated and needs to be adjusted when a definite project task duration is known, setting an estimated flag to indicate that the project task duration is estimated;
 when the user indicates that the project task duration is estimated via the duration estimated field, setting the estimated flag to indicate that the project task duration is estimated;
 displaying the project task duration by displaying a project task duration string that includes the project task duration value, the project task duration display type, and when the project task duration is estimated as indicated by the estimated flag, the project task estimated character wherein the project task estimated character is not displayed when the project task duration is not estimated; and
 updating the project task duration that is estimated when a definite project task duration is known.

12. The method of claim 11 wherein tasks are hierarchically organized and wherein when a parent task has at least one child task whose duration is estimated, indicating that the duration of the parent task is estimated.

13. The method of claim 11 including upon receiving a request to display only tasks whose durations are estimated, displaying an indication of each such task.

14. A computer-readable storage medium containing instructions for controlling a computing device to specify whether a project task duration of a project plan is estimated, by a method comprising:
 displaying a project task duration field and a duration estimated field;
 receiving from a user a project task duration string via the project task duration field, the project task duration string including a project task duration value and a project task duration display type;
 when the project task duration string includes a project task estimated character that is a single character, setting an estimated flag to indicate that the project task duration is estimated;
 when the user indicates that the project task duration is estimated via the duration estimated field, setting the estimated flag to indicate that the project task duration is estimated;
 storing an indication of the project task duration value and the project task duration display type of the project task duration string;
 when the user indicates that the project task duration is no longer estimated, updating the project task duration value and setting the estimated flag to indicate that the project task duration is not estimated; and
 displaying the project task duration by displaying a project task duration string that includes the project task duration value, the project task duration display type, and when the project task duration is estimated as indicated by the estimated flag, a project task estimated character such that the project task estimated character is not displayed when the project task duration is not estimated.

15. The computer-readable storage medium of claim 14 including updating the project task duration that is estimated when a definite project task duration is known.

16. The computer-readable storage medium of claim 14 wherein when in dialog mode, the user indicates that the project task duration is estimated via the duration estimated field or project task estimated character of the project task duration string and when in sheet mode, the user indicates that the project task duration is estimated via the project task estimated character of the project task duration string.

17. The computer-readable storage medium of claim 14 wherein the indication as to whether the duration is estimated or definite is a symbol of uncertainty specified as part of the project task duration string.

18. The computer-readable storage medium of claim 14 wherein tasks are hierarchically organized and wherein when a parent task has at least one child task whose duration is estimated, indicating that the duration of the parent task is estimated.

* * * * *